April 23, 1963 T. STERN 3,086,343
VAPOR-LIQUID SEPARATING APPARATUS
Filed June 24, 1960 2 Sheets-Sheet 1
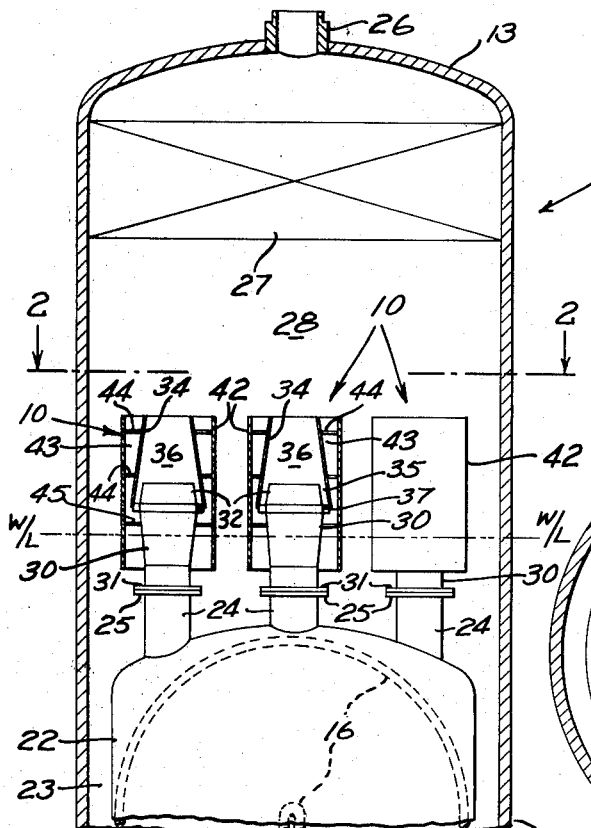
Fig. 1.
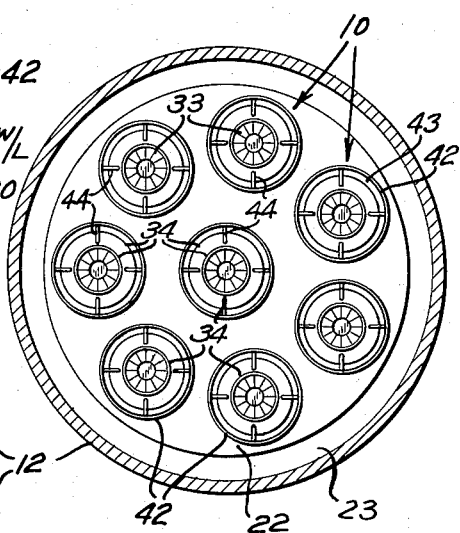
Fig. 2.
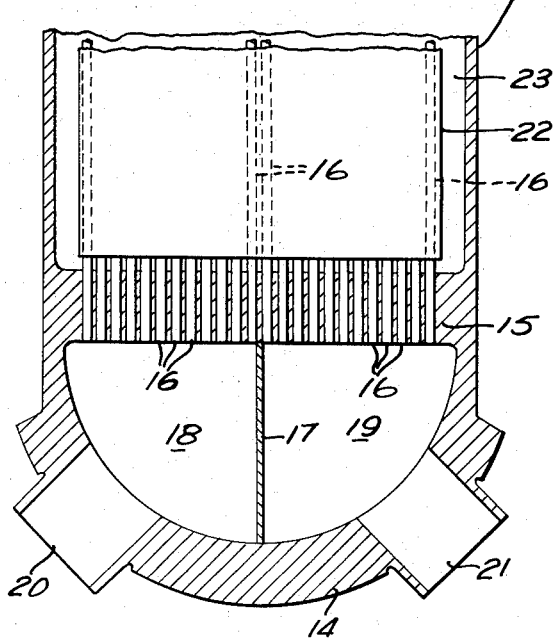
INVENTOR.
TOBIAS STERN
BY
*Arthur Frederick*
ATTORNEY April 23, 1963 T. STERN 3,086,343
VAPOR-LIQUID SEPARATING APPARATUS
Filed June 24, 1960 2 Sheets-Sheet 2

INVENTOR.
TOBIAS STERN
BY
Arthur Frederick
ATTORNEY

United States Patent Office 3,086,343
Patented Apr. 23, 1963

3,086,343
VAPOR-LIQUID SEPARATING APPARATUS
Tobias Stern, Brooklyn, N.Y., assignor to Foster Wheeler Corporation, New York, N.Y., a corporation of New York
Filed June 24, 1960, Ser. No. 38,508
3 Claims. (Cl. 55—456)

The invention relates to vapor-liquid separating apparatus and more specifically to centrifugal vapor-liquid separating apparatus of the bottom inlet type as distinguished from vapor-liquid separating apparatus having tangential inlets disposed adjacent the top portion of the separating structure to receive the vapor and liquid mixture.

In centrifugal separating apparatus of the bottom inlet type, an upflowing stream, containing a mixture of vapor and liquid, passes into the apparatus through the inlet at the bottom thereof and is centrifugally spun in a whirl chamber whereby the heavier or denser liquid phase of the mixture is thrown outwardly toward the periphery of the whirl chamber and is thereby separated from the lighter or less dense vapor phase of the mixture. The separated vapor flows upwardly through the central portion of the whirl chamber, while the separated liquid spills over the top peripheral edge of the whirl chamber for return to the liquid reservoir of the vessel in which the separating apparatus is disposed. The pressure drop through the aforedescribed apparatus is relatively high since the liquid must be forced upwardly to cascade over the top peripheral edge of the whirl chamber. In addition, it has been found that the separated liquid retains an appreciable amount of vapor which is returned to the liquid reservoir. This recirculation of vapor in the separated liquid adversely affects the efficiency of the apparatus and necessitates larger or a greater number of separating units for a given load than would otherwise be necessary if separation were more complete.

It is therefore one of the objects of the present invention to provide an improved separating apparatus of the bottom inlet type wherein pressure drop therethrough is less than in heretofore known separating apparatuses.

Another object of this invention is to provide an improved separating apparatus of the bottom inlet type, which more efficiently effects separation of liquid and vapor so that vapor of acceptable dryness and purity is available for use.

A further object of the present invention is to provide an improved separating apparatus of the bottom inlet type, which effects optimum separation and minimum recirculation of vapor into the liquid reservoir.

Accordingly, the present invention contemplates a centrifugal separating apparatus comprising a bottom inlet means communicating with a source of vapor and liquid, such as the liquid space of a steam and water drum or a vapor generating chamber, to receive from the latter an upflowing stream containing a mixture of vapor and liquid. A means forming a whirl chamber is disposed in communication with said bottom inlet means and defines with the latter a liquid downflow passageway. The inlet means is provided with impellers which are positioned and arranged to centrifugally throw the vapor-liquid mixture outwardly at high velocity into the whirl chamber, which action effects a separation of the vapor from the liquid. The separated liquid adjacent the periphery of the whirl chamber flows downwardly into and through the downflow passageway while the separated vapor flows upwardly through and out of the top of the whirl chamber. Vane means are disposed in the downflow passageway, which vane means converts the downward angular velocity of the separated liquid to a substantially horizontal velocity so that the liquid discharges radially from the downflow passageway. A baffle is disposed exteriorly around the means forming a whirl chamber to define with the latter means a vapor passageway. The baffle also serves as an impingement plate against which the liquid radially discharging from the downflow passageway, strikes to cause separation of entrained vapor from the liquid. The separated vapor then flows upwardly through the vapor passageway formed between the baffle and the means defining the whirl chamber, while the liquid flows downwardly into the liquid reservoir.

The invention will be more fully understood from the following description thereof, when considered in connection with the accompanying drawings in which:

FIG. 1 is a sectional view in elevation of a vapor generator having vapor-liquid separating apparatuses according to this invention;

FIG. 2 is a cross-sectional view taken substantially along line 2—2 of FIG. 1;

Figure 3:
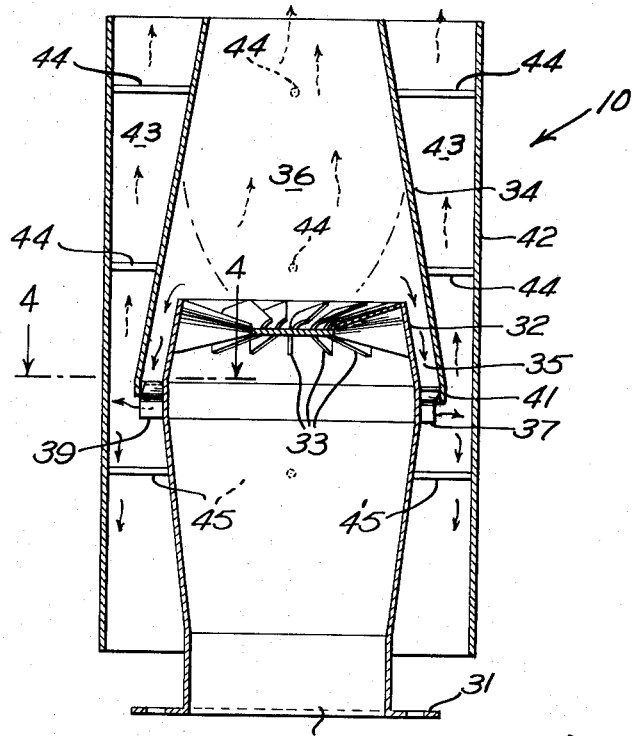
FIG. 3 is an enlarged fragmentary view in section of one of the vapor-liquid separating apparatuses according to this invention.

Referring now to the drawings, and more particularly to FIGS. 1 and 2, the centrifugal vapor-liquid separating apparatuses according to this invention are designated by the reference numeral 10 and are shown as applied to an upright cylindrical steam generator 11. While centrifugal vapor-liquid separators 10 will be described as employed in an upright cylindrical steam generator, their use is not limited to the latter but may be advantageously used in a wide variety of apparatuses where a high degree of vapor and liquid separation is desired, as for example, in a horizontal steam and water drum of conventional boilers.

The upright cylindrical steam generator 11 comprises a cylindrical body portion 12 closed at the top and bottom by a wall 13 and a dome-shaped wall 14, respectively. A horizontal tube sheet 15 is disposed adjacent bottom wall 14, which tubes sheet supports a bank of vertically extending U-shaped tubes 16. A vertical partition 17 extends between tube sheet 15 and bottom wall 14 to divide the space between the tube sheet and the bottom wall into an inlet chamber 18 and an outlet chamber 19. An inlet connection 20 is provided in bottom wall 14 and is connected to receive a heated fluid from a suitable source thereof and pass the heated fluid into inlet chamber 18. Bottom wall 14 is also provided with an outlet connection 21 to receive cooled fluid from outlet chamber 19 and pass the cooled fluid from the steam generator to a place for reheating. An inverted cup-shaped baffle 22 is disposed over U-tubes 16 and is suitably supported by means, not shown, in spaced relationship with the upper surface of tube sheet 15 and the inner surface of body portion 12 of the steam generator. Baffle 22 and the inner surface of body portion 12 define therebetween an annular downcomer passageway 23 which communicates with the steam generating chamber formed by the cup-shaped baffle 22, through the space between the lower end edge of baffle 22 and tube sheet 15. In the top of baffle 22, is arranged a plurality of vertically extending outlet pipes 24. Pipes 24 are provided with mounting flanges 25 to which are secured centrifugal separators 10. The steam generator is provided with a feed water inlet connection (not shown) for introducing water into the vapor generator to provide a normal liquid level indicated at W/L. A steam outlet connection 26 is provided in top wall 13 and is connected to deliver steam to a place of use, such as a steam turbine. A secondary dryer 27, schematically indicated in FIG. 1, may be disposed between centrifugal separators 10 and outlet connection 26 to insure the removal of water from steam and the passage of steam from the steam generator of the desired degree of dryness. Dryer 27 may be of any conventional design, such as the chevron, wire mesh, or any other suitable type well known by those skilled in the art.

In operation of steam generator 11, hereinabove described, heated fluid passes into inlet chamber 18 through inlet connection 20, and thence upwardly through the inlet leg portions of U-tubes 16 and downwardly through the outlet leg portions of U-tubes 16. The heated fluid in passing through U-tubes 16 passes in indirect heat exchange relationship with water in the steam generating chamber formed by baffle 22 and thereby generates saturated steam. The cooled heated fluid passes from U-tubes 16 into outlet chamber 19 and thence through outlet connection 21 to apparatus for reheating. The saturated steam flows from the steam generating chamber upwardly into outlet pipes 24 and into and through centrifugal separators 10. The saturated steam in flowing through centrifugal separators 10, as hereinafter fully described, is freed of substantially all entrained water and flows upwardly into the vapor space 28 which is formed above the water level W/L in the steam generator 11. The steam then flows through dryer 27 where additional water, if any, is removed. The dried steam passes from dryer 27 into outlet connection 26 from where it is conducted to a place of use, such as a steam turbine. The water separated from the steam in centrifugal separators 10 and dryer 27 returns to the water space and is recirculated through downcomer passageway 23 to the steam generating chamber formed by baffle 22.

Figure 4:
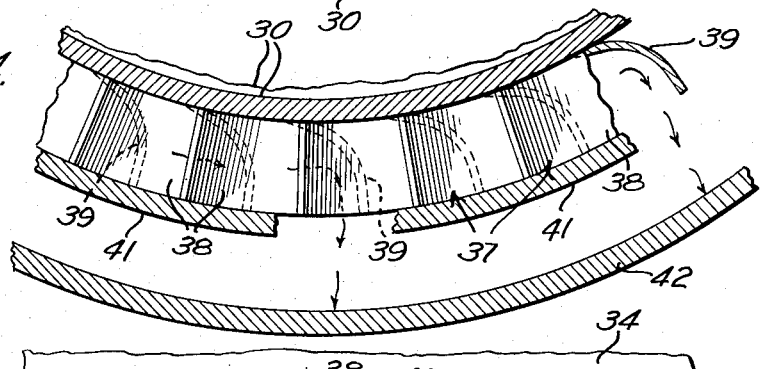
FIG. 4 is a fragmentary view taken substantially along line 4—4 of FIG. 3, and on an enlarged scale.
Figure 5:
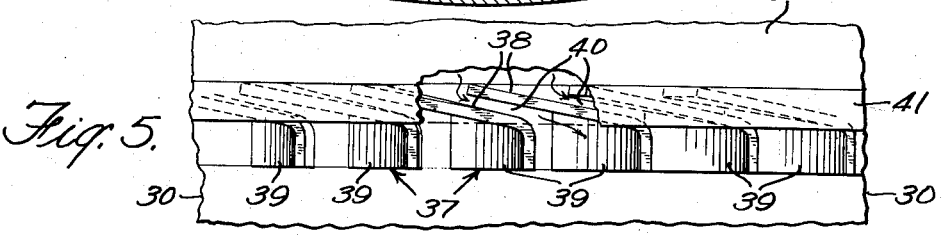
FIG. 5 is a fragmentary view in elevation, of the vanes disposed in the downflow passageway and shown in FIG. 4.

As best shown in FIGS. 3, 4 and 5, each of the centrifugal separators 10 comprises an inlet pipe 30 which is provided with a flanged end portion 31 by which it is mounted on and secured to the flange 25 of an outlet pipe 24. The upper outlet end portion 32 of pipe 30 has a frusto-conical shaped configuration within which is secured a plurality of vanes 33. The vanes 33 are formed and arranged to impart a spin to the steam and water mixture discharging through the outlet end portion 32 of pipe 30.

A frusto-conical shaped baffle 34 is positioned with respect to pipe 30, so that the lower end portion of baffle 34 overlaps outlet end portion 32 of pipe 30. Baffle 34 is dimensioned so that the lower end portion thereof extends parallel to and in concentric spaced relationship with outlet end portion 32 to define with the latter an annular downflow passageway 35. Baffle 34 also extends a substantial distance above pipe 30 to form a whirl chamber 36 which receives the spinning steam and water mixture discharging from the outlet end portion 32 of pipe 30. The inward inclination of baffle 34 is such that the vortex formed by the whirling liquid in whirl chamber 36 is prevented from spilling over the top edge of the baffle 34 under all operating conditions of the steam generator. Baffle 34 is supported and secured to pipe 30 by a plurality of vanes 37 which are disposed at the outlet end of downflow passageway 35.

Each of the vanes 37, as best shown in FIGS. 4 and 5, have a flat inclined portion 38 and a vertically extending pendant, curved end portion 39 at the lower end of the inclined portion 38. Vanes 37 are arranged within downflow passageway 35 with the inclined portions 38 of each vane spaced from the next adjacent vane to define therebetween an inclined flow path 40 for liquid discharging from passageway 35 (see FIG. 5). Vanes 37 are secured along their respective inner edges, as by welding, to the exterior surface of pipe 30, while the outer edges of each of the inclined portions 38 of vanes 37 are suitably secured, as by welding, to a cylindrical skirt 41 of baffle 34. Skirt 41 serves to prevent liquid from spilling over the outer edges of the inclined portions 38 and confines the flow of liquid to flow paths 40 so that all of the liquid impinges the pendant curved end portions 39 and is directed by the end portions 39 substantially horizontally and radially outwardly with respect to pipe 30.

While theoretically a whirl chamber may be designed to provide complete separation of liquid and vapor, in actual practice, complete separation is not effected in a whirl chamber and, therefore, the separated water flowing through downflow passageway 35 contains entrained steam. It is, therefore, important for improved efficiency to achieve separation of the steam entrained in the water flowing through downflow passageway 35. The novel vanes 37 are effective in causing some separation of steam and water as the direction of flow of the water and steam mixture is changed from a substantially angular-downward direction to a substantially horizontal direction by the pendant curved end portions 39 of vanes 37. To disentrain the remaining steam, an open ended cylindrical baffle 42 is coaxially disposed over the previously described inlet pipe and frusto-conical sub-assembly of centrifugal separator 10. Baffle 42 has a diameter greater than the diameter of skirt 41 and is supported in spaced relation to pipe 30 and frusto-conical baffle 34 to define with the latter baffle an annular steam upflow passageway 43. Baffle 42 is supported on baffle 34 by two vertically spaced sets of radially extending rods 44, which are arranged in circumferential spaced relationship with each other around baffle 34. The lower end of baffle 42 is supported on pipe 30 by a plurality of radially extending circumferentially spaced rods 45, similar to rods 44. Baffle 42 functions as an impingement plate against which the water, containing entrained steam, strikes upon being discharged by vanes 37 from downflow passageway 35. The discharged water in striking baffle 42 causes dislodgement of substantially all of the remaining steam entrained in the water, the disentrained steam flowing upwardly through passageway 43, along with steam separated at vanes 37, while the water flows downwardly between baffle 42 and pipe 30 into the liquid space of the steam generator.

In operation of centrifugal separators 10, saturated steam generated in the steam generating chamber, formed by cup-shaped baffle 22, flows upwardly through outlet pipes 24 into inlet pipes 30 of centrifugal separators 10. In each of the centrifugal separators 10, the saturated steam flows upwardly through inlet pipe 30 and through vanes 33 disposed in the outlet end portion 32 of pipe 30. The steam and water mixture in passing through vanes 33 is spun and discharged into whirl chamber 36 in a whirling flow pattern which causes the denser phase water to be thrown against the walls of baffle 34 while the lighter phase steam flows upwardly through the whirl chamber and into the vapor space 28 of steam generator 11, as indicated by the broken line arrows in FIG. 3. As shown by the full line arrows in FIGS. 3, 4 and 5, the separated water passes spirally downwardly from whirl chamber 36 into downflow passageway 35 and thence into the flow paths 40 formed between the adjacent vanes 37 disposed at the outlet of downflow passageway 35. The downward spiraling flow of water is discharged substantially radially and horizontally from passageway 35 by action thereon of the pendant curved end portions 39 of vanes 37. This change in direction of flow of water effects some separation of steam entrained in the water, which steam flows upwardly through passageway 43 and into the vapor space 28 of steam generator 11. The radially discharged water impinges against baffle 42 which disentrains still further quantities of steam, which steam flows upwardly through passageway 43 and thence into vapor space 28. The water, which is now substantially free of steam, flows into the liquid space of the generator from where it is returned by way of annular downcomer passageway 23 to the steam generating chamber of steam generator 11.

It can be seen from the foregoing description, that an improved centrifugal separating apparatus of the bottom inlet type has been provided which is capable of providing more complete separation of vapor and liquid, than centrifugal separators heretofore known. It is a centrifugal separator wherein recirculation of vapor in the separated liquid is reduced to a negligible amount and, thereby, provides a centrifugal separator of increased capacity. In addition, by reason of the novel cooperative relationship between the frusto-conical shaped whirl chamber and the liquid downflow passageway, the pressure drop through the centrifugal separator of this invention is substantially less than in conventional upflow separators where the separated water must be forced upwardly to cascade over the top of the peripheral wall of the whirl chamber.

Although, but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art. It is also to be expressly understood that the invention is not limited to employment in the steam generator shown, but has application to the separation of vapor and liquid in a wide variety of devices and apparatuses.

In the claims:

1. A vapor-liquid separating apparatus comprising a vertically disposed intake conduit having a lower inlet end and an upper outlet end and communicating at the lower end with an upflowing stream containing a mixture of vapor and liquid, a vertically extending first baffle having open upper and lower ends disposed with its lower end overlapping and in spaced relationship with the upper end of said intake conduit to define with said intake conduit a downflow passageway, said first baffle defining above said intake conduit a whirl chamber in communication with said conduit and said downflow passageway, means disposed in said intake conduit adjacent the outlet thereof to impart a centrifugal spin to said upflowing mixture of vapor and liquid as said mixture discharges into said whirl chamber, said first baffle extending a substantial distance above said intake conduit so as to laterally confine the full flow of said mixture for a distance sufficient to cause substantial separation of vapor and liquid in said whirl chamber, the separated vapor flowing upwardly through said whirl chamber and the separated liquid flowing downwardly through said downflow passageway, a second baffle having open upper and lower ends encompassing at least in part said first baffle and said intake conduit and extending from a point below said downflow passageway upwardly in spaced relationship with said intake conduit and said first baffle to define with said intake conduit a liquid passageway and with said first baffle a vapor passageway, said liquid passageway communicating with said downflow passageway to receive liquid therefrom, said vapor passageway communicating with said liquid passageway to receive vapor released from the liquid in said liquid passageway, and vane means disposed adjacent the lower end of said downflow passageway to convert the downward angular velocity of the separated liquid from said whirl chamber into a substantially horizontal flow so that the liquid discharged from said downflow passageway impinges on said second baffle to cause further separation and release vapor entrained in said separated liquid, said first baffle having an inverted frusto-conical shape converging in an upward direction and arranged to prevent separated liquid in said whirl chamber from passing over the top edge of said baffle.

2. A free flow vapor-liquid separating apparatus in combination with a vessel having a liquid space containing a mixture of vapor and liquid and a vapor space comprising, a vertically disposed intake conduit having a lower inlet end and an upper outlet end and communicating at the lower end with said liquid space to receive an upflowing stream containing a mixture of vapor and liquid, said upper end being above the normal liquid level in said vessel, a vertically extending first baffle having open upper and lower ends and disposed with its lower end overlapping and in spaced relationship with the upper end of said intake conduit to define with said upper end a downflow passageway also above said normal liquid level, said first baffle defining above said intake conduit a whirl chamber in communication with said conduit and said downflow passageway, means disposed in said intake conduit adjacent the outlet thereof to impart a centrifugal spin to said upflowing mixture of vapor and liquid as said mixture discharges into said whirl chamber, said first baffle extending a substantial distance above said intake conduit so as to laterally confine the full flow of said mixture for a distance sufficient to cause substantial separation of vapor and liquid in said whirl chamber, the separated vapor flowing upwardly through said whirl chamber and the separated liquid flowing downwardly through said downflow passageway, and a second baffle having open upper and lower ends encompassing at least in part said first baffle and said intake conduit and extending from a point below said downflow passageway and below the normal liquid level in said vessel upwardly, exteriorly of, and in spaced relationship with said intake conduit and said first baffle to define with said intake conduit a liquid passageway and with said first baffle a vapor passageway, means disposed adjacent the lower end of said downflow passageway to convert the downward annular velocity of the separated liquid into a substantially horizontal radial velocity so that the liquid discharged from said downflow passageway impinges on said second baffle to cause further separation and to release vapor entrained in said separated liquid, said liquid passageway communicating with said downflow passageway to receive liquid therefrom, said vapor passageway communicating with said liquid passageway to receive vapor released from the liquid in said liquid passageway, said first baffle having an inverted frusto-conical shape converging in an upward direction and arranged to prevent separated liquid from passing over the top edge of said baffle.

3. A vapor-liquid separating apparatus comprising an upwardly disposed intake conduit having a lower inlet end and an upper outlet end, a vertically extending first baffle having an open ended, inverted, frusto conical configuration converging in an upward direction with its lower wider end overlapping and in spaced relationship with the outlet end of said intake conduit to define with the intake conduit a downflow passageway, means disposed within said intake conduit adjacent the outlet end thereof to impart a centrifugal spin to an upflowing vapor and liquid mixture, said first baffle extending a substantial distance above said intake conduit defining thereabove a whirl chamber arranged to laterally confine the full flow of said mixture for a distance sufficient to cause substantial separation of vapor and liquid in said whirl chamber, a second baffle encompassing at least in part said first baffle and said intake conduit and extending from a point below said downflow passageway upwardly in spaced relationship with the intake conduit and said first baffle to define an annular passageway with said intake conduit and said first baffle, and vane means disposed adjacent to the lower end of said downflow passageway arranged to convert the downward annular velocity of a mixture flowing therethrough from said whirl chamber into a substantially horizontal flow impinging on said second baffle to cause further separation.

References Cited in the file of this patent

UNITED STATES PATENTS

| | | |
|---|---|---|
| 1,811,043 | Donaldson | June 23, 1931 |
| 2,594,490 | Patterson | Apr. 19, 1952 |
| 2,664,966 | Moore | Jan. 5, 1954 |